July 15, 1924.
W. G. BERGMAN
GAS AND AIR REVERSING VALVE
Filed Nov. 6, 1922   2 Sheets-Sheet 1
1,501,552
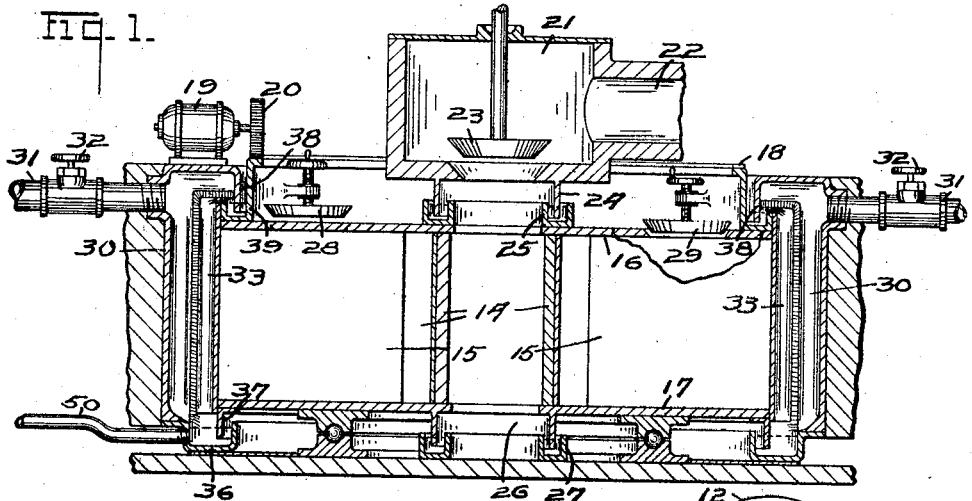
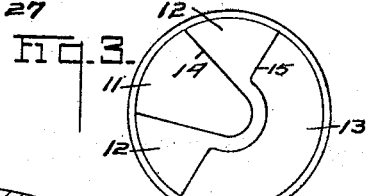
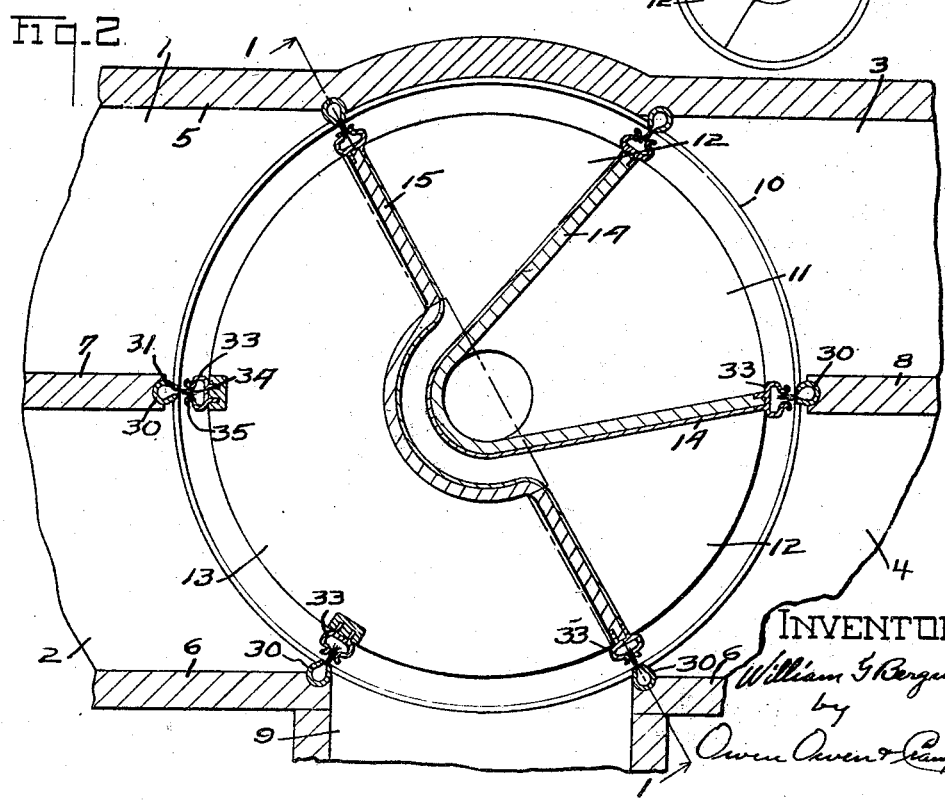
INVENTOR
William G. Bergman
by
Owen Owen & Crumpler

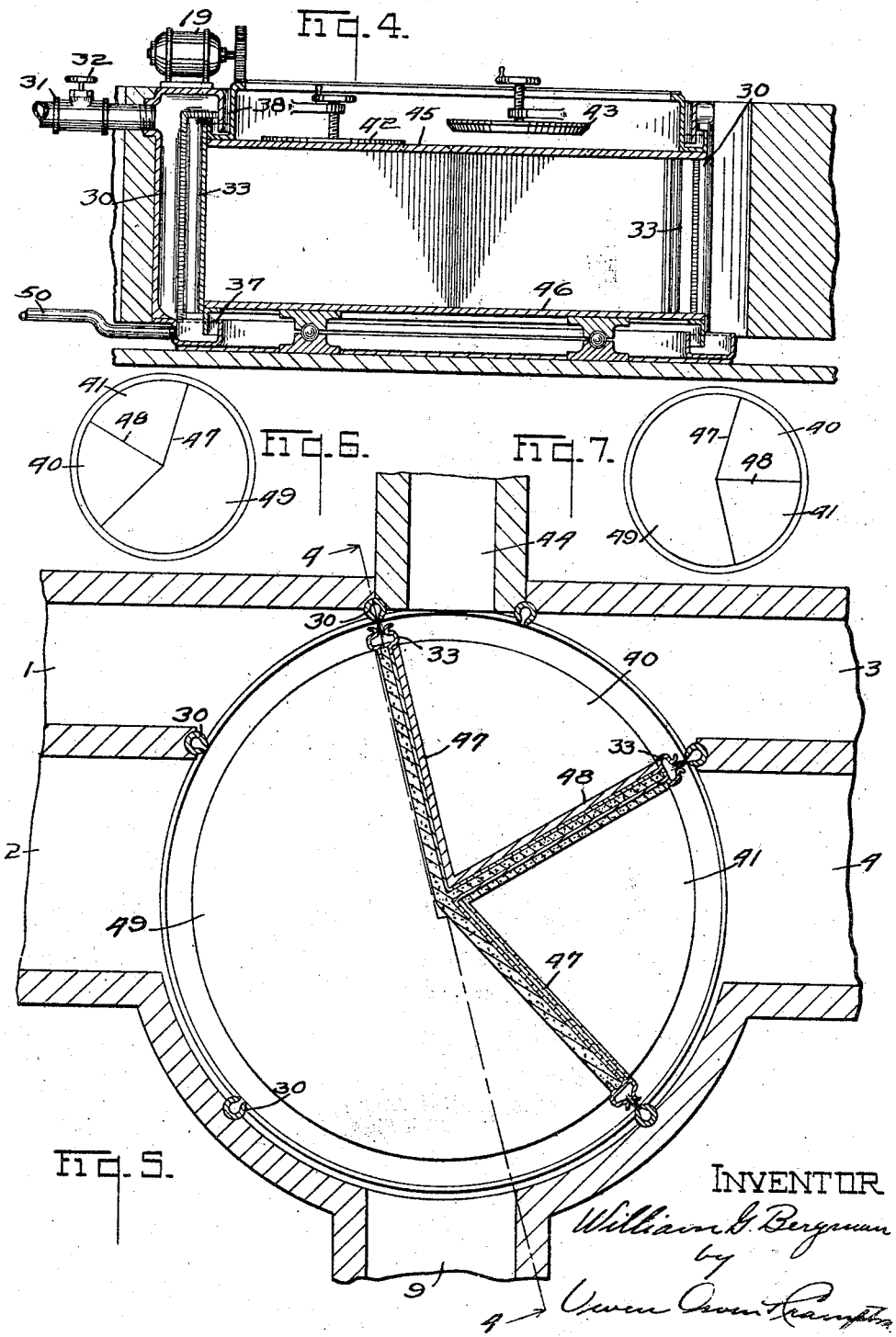

Patented July 15, 1924.

1,501,552

UNITED STATES PATENT OFFICE.

WILLIAM G. BERGMAN, OF POINT PLACE, OHIO.

GAS AND AIR REVERSING VALVE.

Application filed November 6, 1922. Serial No. 599,482.

*To all whom it may concern:*

Be it known that I, WILLIAM G. BERGMAN, a citizen of the United States, and a resident of Point Place, in the county of Lucas and State of Ohio, have made an Invention Appertaining to a Gas and Air Reversing Valve; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to produce an efficient valve mechanism for controlling the gas movements to and from a furnace, that is heated by fuel gas. The valve establishes connection between a source of fuel gas supply and one or another of the passageways that lead to the furnace, and also a connection with the outside atmosphere to passageways which likewise lead to the furnace. In large furnaces, as for example glass furnaces, the passageways are provided with means for heating the gas in its passage to the furnace and also for heating the air whereby the two are raised to near the kindling point as they progress to the mixing chamber or burner. The fuel gas and air is commonly heated by checkerwork located in the passageways, and two sets of passageways are provided, one of the sets being used as the outlet for the heated products of combustion for a short period of time, while the other is being used for the inlet of the fuel gas and air. At the expiration of the period the first set of passageways is used for conducting the fuel gas and the air to the furnace and the other set is used for conducting the heated burnt gases or products of combustion from the furnace to the stack. Thus while the fuel gas and air is directed alternately through the sets of passageways it is being heated by the checkerwork that was heated during the previous period by the products of combustion. The valves, as is well known in the art, are used to reverse the flow of the gases to and from the furnace through the passageways.

My invention has for its particular object to provide a valve which is so located with respect to the passageways that there will be a direct flow from the passageways when they are used as the outlet for conveying gases to the stack, thereby reducing the friction and producing a direct draft and reducing the amount of the solid products of combustion that would collect particularly in the valve. Provision may also be made for a direct flow from the source of supply to one or another of the passageways. I have by my invention provided a valve which is so constructed that it may be located within the defining planes of the top and bottom and substantially within the planes of the sides of the passageways through which the gases are directed to and from the furnace. The invention also provides an efficient sealing means whereby substantially vertical registering walls of the passageways and the chambers of the valve may be sealed. The invention consists in other features and has other advantages which will appear upon examination of the drawings and the description thereof.

Structures containing the invention may partake of different forms. To illustrate a practical application of the invention I have selected one or two structures containing the invention as examples of such structures and shall describe them hereinafter. The structures selected are shown in the drawings.

Figure 1 of the drawings illustrates a sectional view of the valve taken on the line 1—1 indicated in Fig. 2. Fig. 2 is a sectional or plan view of the structure illustrated in Fig. 1. Fig. 3 is a diagrammatic view showing the alternative position in which the valve may be placed for the control of the gas currents to and from the furnace. Fig. 4 illustrates a vertical sectional view taken on the line 4—4, indicated in Fig. 5, of a modified form or structure embodying my invention. Fig. 6 illustrates an alternate position for the valve. Fig. 7 illustrates a third position in which the valve may be placed for connecting the source of fuel gas supply directly with the stack in order to perform what is known as the burning out of the carbonaceous materials that may collect within the passageway between the source of fuel gas supply and the valve.

The passageways 1, 2, 3 and 4 for the gases contain or lead to the checker work located between the valve and the furnace. They are located between the walls 5 and 6 and sets or pairs of the passageways are separated by the walls 7 and 8. A passageway 9 extends through and from the wall 6 and leads to the stack which produces the draft through the passageways and the furnace.

Substantially between the top and bottom walls of the passageways is located the valve 10 which is provided with the chambers, 11 for the fuel gas, 12 for the air and 13 for the exhaust gases, that is, the products of combustion produced in the furnace. The chambers 11, 12 and 13 are formed by the walls 14 and 15 that are located between the top and bottom walls 16 and 17. The valve is cylindrical in form and is disposed between the walls 5 and 6 of the passageways and between the ends of the walls 7 and 8.

Suitable means is provided for rotating the valve in order that connection may be established for the incoming and outgoing gases alternately with the pairs or sets of passageways in order that the checkerwork may be heated by the exhaust gases and the intake gases may be heated by the checkerwork. In the form of construction shown, the valve 10 is rotated by means of a suitable rack 18 that may be operated by a motor 19 and a gear wheel 20. The valve 10 is rotated periodically to establish connection between certain of the passageways and the chambers of the valve. When the valve is in one position the edges of the wall 14, that forms the chamber 11, register with the passageway 3 and thus fuel gas is supplied to the passageway 3. At the same time the edges of the walls 14 and 15 register with the defining walls of the passageway 4 and thus air is supplied to the passageway 4. The fuel gas and air is drawn through the passageways 3 and 4 and the furnace by means of the stack which is connected with the passageway 9. When the chambers 11 and 12 register with the passageways 3 and 4 the chamber 13 connects the passageways 1 and 2 with the stack through the chamber 13 of the valve and the passageway 9.

The fuel gas may be allowed to enter from below or above. If desired, a valve may be provided for controlling the flow of the fuel gas. In Fig. 1 a chamber 21 is connected by means of a passageway 22 to the source of fuel gas supply. The outlet of the chamber 21 may be controlled by a suitable valve 23 which opens and closes the passageway to the chamber 11. The lower side of the lower wall of the chamber 21 may be provided with a depending flange 24 that protrudes into a trough 25 that may be partially filled with water so as to cover the lower edge of the flange 24. By this arrangement the valve may be rotated and yet connection maintained with the chamber 21. The lower wall of the chamber 11 may be closed completely by the wall 17 or it may be water sealed by the flange 26 and the trough 27. The particular construction shown provides a means whereby the chamber 11 may be connected to the source of fuel gas supply, either through the bottom or the top of the valve.

The chamber 12 may be connected with the exterior atmosphere through openings formed in the top wall 16 of the valve. The openings may be controlled by the valves 28 and 29. In the operation of the device the valve above one end of the chamber 12 other than the end which is connected with the passage is preferably opened, while the other valve is closed, or the first valve is opened wide while the other is only partially opened. This causes the air to pass through the valve and between the chambers 11 and 13, that is, between the walls 14 and 15 which separate the chambers 11, 12 and 13. The air current thus being directed through the valve operates to cool the valve or maintain it at a lower temperature than it would otherwise be raised by the heat of the exhaust gases. The wall 15 extends substantially diametrically across the valve and forms the semi-circular chamber 13 that connects the passageways 1 and 2 with the stack 9 when the chamber 11 is connected with the passageway 3 and the chamber 12 is connected with the passageway 4. This operates to draw the products of combustion through the passageways 1 and 2 and direct the fuel gas and air into the passageways 3 and 4. To reverse the flow of the current the valve is rotated, the gas and air valves 23 and 28 and 29 having been closed. The walls of the chamber 11 are then made to register with the passageway 1, which locates the other end edges of the walls 14 and 15 in registering position with the walls 6 and 7. Air is thus supplied to the passageway 2 at the same time the passageways 3 and 4 are connected by the chamber 13 located on one side of the wall 15, to the passageway 9 which leads to the stack.

In order to prevent the air from intermingling with the exhaust gases, and in order to prevent the intermingling of the air and fuel gas, my invention provides an efficient sealing means which will readily adjust itself to irregularities of construction and operation of the valve, particularly to such changes in the valve and walls of the passageways that will be produced by the changes in the temperature. I have thus overcome by my invention the greater difficulties which are met with in the construction of direct connecting valves. To seal the edges of the walls that form the chambers of the valve with the edges of the defining walls of the passageways, sheets of a fluid, such as water, waste gas, steam, etc., are directed from one to the other. Hollow members 30 are provided with slits 31 and are connected to a source of water supply under pressure by means of the pipe 31. The supply of the water to the members or nozzles 30 may be controlled by any suitable means, such as by the valve 32. The nozzles 30 extend the height of or preferably a little higher than, the height of the chambers of the valve 10. The nozzles 30 are located on the side wall 5 and at the corners of the passageways 9 and at the ends of the walls 7 and 8. The valve is provided with hollow members 33 having slits 34. The members 33 form receiving troughs for the sheet of water that issues from the nozzles 31. The members 33 are provided with flaring lips 35 located along the edges of the slits 34 so as to gather and direct the sheets of water from the nozzles 30. The trough members 33 communicate with a circular trough 36 with which the lower ends of the members 33 register and into which the water flows from the members 33 as it is received from the nozzles 30. The lower edge of the valve may be provided with a depending flange 37 which may extend into the trough 36 and thus water-seal the bottom of the valve. The top of the valve may be water-sealed by means of the flange 38 which extends into the trough 39 and which also receives water from the nozzles 30. The trough 39 is located on the top of the valve and is rotated therewith, while the flange 38 is supported on the walls that define the passageways and extend downward from the top of the walls and into the trough. The nozzles 30 extend over the edge of the trough 39. From the lower ends of the nozzles 30 the water flows into the lower trough 36. Thus a continuous sheet of moving water extends from one sealing trough to the other. The water may be drawn from the trough 36 by means of a pump through a pipe 50 and used continuously.

The draft produced by the chimney causes but a small pressure on opposite sides of the sheets of water, the distance between the edges or slits of the nozzles 30 and the receiving troughs 33 being small. The sheets of water produced by the nozzles thus effectually seals the passageways and the chambers and prevents short circuiting of the draft and intermingling of the air and the fuel gas, and yet the seal is of such a character that there will be no binding between the valve and its surrounding walls or supporting parts, which would otherwise be caused by the changing of sizes produced by the variable temperatures to which they are subjected.

In the form of construction illustrated in Figs. 4 and 5 the chambers 40 and 41 are provided with the valves 42 and 43. The source of producer gas may be connected through the passageway 44 to the chamber 40 or 41 which is placed in juxtaposition with the end of the passageway. As shown in Fig. 5, the producer gas passes through the chamber 40 into the passageway 3. During this period the valve 43 is open and the air passes through the chamber 41 into the passageway 4, while at the same time the exhaust gases pass through the passageways 1 and 2 to the stack through the passageway 9. When the fuel gas and the air is to pass through the checkerwork that has been heated by the products of combustion that pass through the passageways 1 and 2 the valve is rotated, that is, the current directions are reversed, whereupon the valve 43 is closed and the valve 42 is opened. The producer gas then passes through the chamber 41 to the passageway 1, and the air passes through the chamber 40 to the passageway 2.

The chambers 40 and 41 are defined by the top and bottom walls 45 and 46 of the valve and the partitioning walls 47 and 48. Parts of the wall 47 are at an angle slightly greater than 180° and forms the exhaust chamber 49 of the valve. The angular relation of the parts of the walls 47 is such that one part of the wall may be made to register with one side of the passageway 44 and the other part of the wall will register with some side of the passageway 9, whereby there is a direct connection established between the passageway 44 that leads from the source of supply of fuel gas and the stack through the passageway 9. When this connection is established the passageways leading from the source of fuel gas to the stack may be burnt out. The same connection may also be established in the form of construction illustrated in Figs. 1 and 2 when the sides of the chamber 11 are caused to register with sides of the passageway 9.

The valve shown in Figs. 4 and 5 may be rotated by any suitable means, such as by the motor 19, and the walls of its chambers may be sealed by the nozzles 30 and the trough members 33 and by the flanges 37 and 38 in the same manner that the valve illustrated in Figs. 1 and 2 is sealed.

I claim:

1. In a gas and air reversing valve, a rotating valve member, two pairs of passageways, the rotating valve member being located between the ends of the passageways and provided with a plurality of chambers, the vertical edges of the walls of the chambers adapted to register with the edges of the walls of the passageways, means for sealing the edges of the walls of the chambers with the edges of the walls that form the passageways other than by contact of the edges of one with the edges of the other.

2. In a gas and air reversing valve, a rotating valve member, two pairs of passageways, the rotating valve member being located between the ends of the passageways and provided with a plurality of chambers, the vertical edges of the walls of the chambers adapted to register with the edges of the walls of the passageways, means for water sealing the edges of the walls that form the passageways.

3. In a gas and air reversing valve, a rotating valve member, two pairs of passageways, the rotating valve member being located between the ends of the passageways and provided with a plurality of chambers, the vertical edges of the walls of the chambers adapted to register with the edges of the walls of the passageways, means for sealing the said vertical edges of the valve with the edges of the walls of the passageways that register therewith other than by contact of the edges of one with the edges of the other.

4. In a gas and air reversing valve, a rotating valve member, two pairs of passageways, the rotating valve member being located between the ends of the passageways and provided with a plurality of chambers, the vertical edges of the walls of the chambers adapted to register with the edges of the walls of the passageways, means for fluid sealing the said vertical edges of the valve with the edges of the walls of the passageways that register therewith.

5. In a gas and air reversing valve, a rotating valve member, two pairs of passageways, the rotating valve member being located between the ends of the passageways and provided with a plurality of chambers, the vertical edges of the walls of the chambers adapted to register with the edges of the walls of the passageways, means for fluid sealing the said vertical edges of the valve with the edges of the walls of the passageways that register therewith, troughs and flanges located at the top and bottom corners of the chambers and the ends of the passageways for water sealing the chambers and the passageways.

6. In a gas and air reversing valve, a sealing means comprising a trough and a nozzle adapted to register one with the other, the nozzle having a slit, means for supplying fluid to the nozzle, the slit operating to direct the fluid from the nozzle to the trough in sheet form.

7. In a gas and air reversing valve, a plurality of nozzles and a plurality of troughs, the troughs and nozzles adapted to register one with the other, means for supplying water to the nozzles, the nozzles having slits for directing the water from the nozzles to the troughs in sheet form.

8. In a gas and air reversing valve, a plurality of nozzles and a plurality of troughs, the troughs and nozzles adapted to register one with the other, means for supplying water to the nozzles, the nozzles having vertical slits for directing the water from the nozzles to the troughs in sheet form.

9. A gas sealing means for gas apparatus comprising a plurality of nozzle members having slits, means for supplying fluid under pressure to the nozzle members, and troughs for receiving the fluid from the slits.

10. A gas sealing means for gas apparatus comprising a plurality of nozzle members having slits, means for supplying water under pressure to the nozzle members, and troughs for receiving water from the slits.

In testimony whereof, I have hereunto signed my name to this specification.

WILLIAM G. BERGMAN.